March 21, 1967  A. M. GEORGE, SR  3,309,808
FISH ROD HOLDER AND HOOK SETTER
Filed Jan. 26, 1966
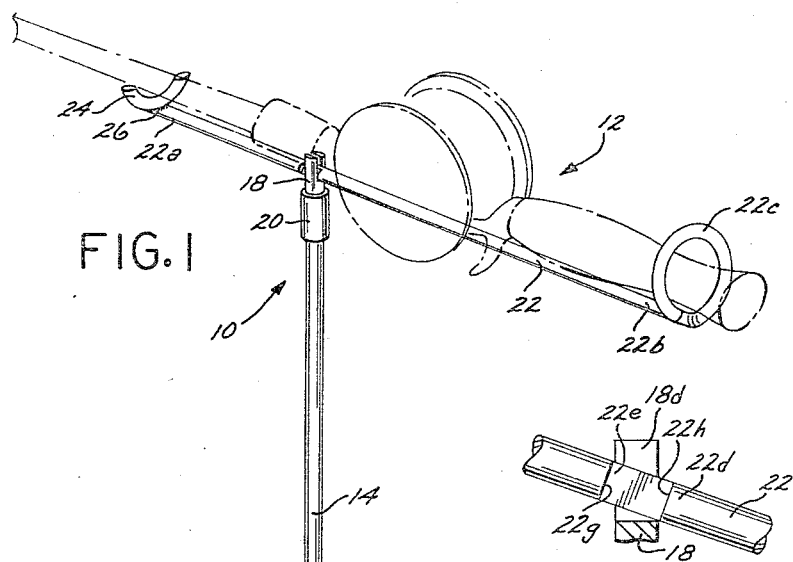
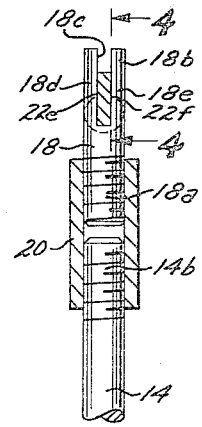
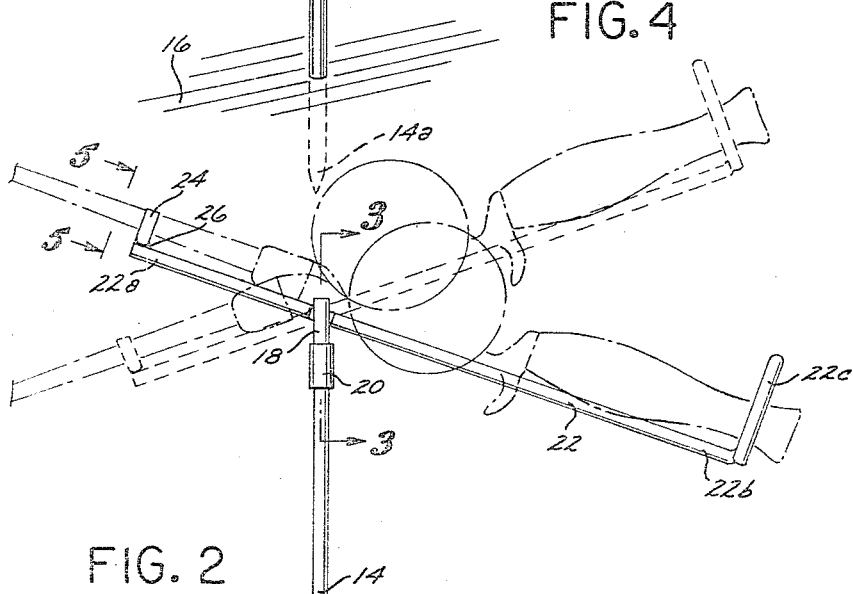
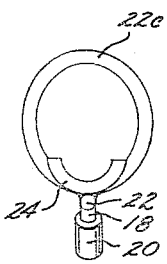
INVENTOR.
ALFRED M. GEORGE SR.
BY
ATTORNEY

United States Patent Office 3,309,808
Patented Mar. 21, 1967

3,309,808
FISH ROD HOLDER AND HOOK SETTER
Alfred M. George, Sr., 432 S. 5th,
Jeannette, Pa. 15644
Filed Jan. 26, 1966, Ser. No. 523,053
6 Claims. (Cl. 43—15)

The present invention relates generally to a fish rod holder and hook setter, and more particularly to such apparatus which can be firmly attached to the oarlock of a boat or can be anchored in the sand or mud at the shoreline of an ocean or lake.

During the past several decades, the sport of fishing has enjoyed increasing popularity. In fact, most men, women and children today participate in this sport in either fresh water or the various oceans.

To enable a fisherman to obtain maximum enjoyment from the sport, it is desirable for him to have means whereby a fish rod can be held in proper position and throughout the relatively long periods of time which the sport consumes. Various designs of rod holders have heretofore been available, but most of them have exhibited major shortcomings. Some of them have not retained the fish rod in proper position. Others have had relatively ineffective means for retaining the rod such that a relatively light pull on the line has caused the rod to be dragged into the water.

Most prior rod holders have been designed to do nothing more than retain the rod in a fixed position. As a result, when a fish has taken the lure at the end of the line of a rod held by such prior devices, the line was either free or it was firmly secured relative to the rod. That is, the reel normally used with fish rods was either set so that the spool would be free running, in which event the line could be freely pulled, or the reel was set so that the spool was non-rotatably positioned. Under the latter circumstances, the line was not free to be unwound from the spool. In either event, the fish was able to easily throw off the plug or lure because the fish hooks of the lure were not set in the fish's mouth. Setting the hooks is an essential step in catching fish since they do not bite hard on the lure when the strike is made. Thus, it becomes necessary to pull the line and lure to force the sharp hooks into the fish's mouth.

It is an object of the present invention to provide a fish rod holder and hook setter which is capable of retaining a fish rod in proper position and is substantially automatic in setting the hook when a strike is made.

Another object of the present invention is to provide a fish rod holder and hook setter as characterized above wherein the entire device can be firmly secured to a boat or within the sand or ground along the shoreline of a lake or ocean.

A further object of the present invention is to provide a fish rod holder and hook setter as characterized above which is adapted to quickly receive and retain a fish rod, and from which the rod can be quickly and easily detached.

A further object of the present invention is to provide a fish rod holder and hook setter as characterized above which is simple and inexpensive to manufacture and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 1 is a perspective view of a fish rod holder and hook setter according to the present invention;

FIGURE 2 is a side elevational view of the device of FIGURE 1;

FIGURE 3 is a fragmentary sectional view, taken substantially along line 3—3 of FIGURE 2;

FIGURE 4 is a fragmentary sectional view, taken substantially along line 4—4 of FIGURE 3; and FIGURE 5 is a fragmentary elevational view, taken substantially along line 5—5 of FIGURE 2.

Like reference characters indicate corresponding parts throughout the several views of the drawings.

Referring to FIGURE 1 of the drawings, there is shown therein a fish rod holder and hook setter 10 according to the present invention, and an ordinary fish rod 12 shown in broken lines. As will be readily apparent to those persons skilled in the art, the particular style or construction of fish rod 12 is of little importance to the present invention since the subject holder is adapted to receive and retain rods of virtually any type or design.

The rod holder and hook setter 10 comprises a mounting or anchoring member 14 which is adapted to engage the oarlock of a boat or which can be inserted within the sand 16 along the shoreline of an ocean or lake. The lower end 14a of member 14 is formed with a taper to facilitate insertion of such member into the sand or ground. The member 14 can easily fit within the oarlock of a boat so that the weight of the holder and fish rod thereon retains the assembly in proper position.

A bifurcated member 18 is secured to anchor member 14 or it may be formed integrally therewith if desired. The embodiment shown in the drawings comprises an internally threaded sleeve 20 for receiving the anchor member 14 and the bifurcated member 18. The upper end 14b of member 14 is provided with external threads for insertion within the sleeve 20. In like manner, the lower end 18a of bifurcated member 18 is threaded for insertion within the sleeve 20.

The upper end 18b of member 18 is slotted as at 18c to provide the desired bifurcation. Thus, there is provided a pair of spaced upstanding support members 18d and 18e.

A retaining element 22 is provided for holding the fish rod 12. The forward end 22a of element 22 is provided with a generally U-shaped support member 24. Such member may take substantially any desired form, and is welded to retaining element 22, as shown at 26.

The rearward end 22b of element 22 is formed with a closed loop 22c for receiving the handle of the fish rod 12. Closed loop 22c may be formed out of element 22 as shown in the drawings, or it may be formed separately and attached thereto as by welding, brazing, soldering or the like.

As shown most clearly in FIGURE 4 of the drawings, an intermediate portion 22d of element 22 is provided with oppositely disposed flat surfaces 22e and 22f. Such surfaces are formed by cutting or grinding the element 22 which is normally made of steel rod or the like. Such flat surfaces 22e and 22f provide shoulders 22g and 22h at the locations where the cylindrical construction of element 22 is diminished to a flat surface. Such shoulders are instrumental in retaining the fish rod 12 in proper operating position and in setting the hook after the fish has taken the bait or lure.

As shown most clearly in FIGURE 4, the element 22 is attached to the bifurcated end of member 18 by insertion of the narrow portion between the surfaces 22e and 22f within the space between the upstanding support members 18d and 18e. The relationship between the spacing of the support members 18d and 18e should be such with respect to the thickness of the element 22 between the surfaces 22e and 22f, to allow the element 22 to pivot with respect to members 18 and 14 as will hereinafter appear.

As shown most clearly in FIGURES 1 and 2 of the drawings, the subject fish rod holder and hook setter is utilized by insertion of the anchoring member 14 within the sand or ground adjacent the body of water to be fished. Thereafter, the retaining element 22 is placed in its normal operating position as shown in solid lines in FIGURE 2. While in this position, the shoulders 22g and 22h of element 22 engage the support members 18d and 18e so as to retain the element 22 at the desired angle to the surface of the water. The rearward portion of the handle of fish rod 12 is inserted within the closed loop 22c of element 22 and the forward portion thereof is caused to rest upon the support member 24. Thus, the rod 12 is properly positioned on the retaining element 22.

With the fish line extended into the water so that the lure is at the proper depth, the reel on the rod should be fixed such that the line is not free running. Thus, the fish line will not be freely payed out from the reel when a strike occurs.

Whereas such a reel setting with prior rod holding devices would cause a strike to instantaneously break the fish line or to pull the lure from the fish's mouth, the present arrangement enables such setting to set the hook in the fish's mouth. That is, with the fish rod 12 in proper position and with the reel thereof adjusted for non-rotation of the spool, a strike while using the present apparatus causes the retaining element 22 and rod 12 thereon to be tilted forwardly into the broken line position shown in FIGURE 2 of the drawings. Such motion is sufficient to permit the fish striking the lure to move a predetermined distance with the lure. Such movement is necessary to provide the desired force for subsequently firmly setting the hook in the fish's mouth.

After the fish has caused the element 22 and rod 12 to be moved to their hook setting positions, the shoulders 22g and 22h of element 22 firmly engage the support members 18d and 18e. That is, the element 22 moves from its original position wherein such shoulders are in engagement with the support members to its hook setting position wherein such shoulders again engage the support members.

When the latter engagement takes place, the entire fish rod, fish line and lure are abruptly and instantaneously brought to a fixed position. The momentum of the fish at this time creates sufficient force to drive the hook into the fish's mouth. Thus, the fish is firmly secured to the fishing apparatus to enable the fisherman to retrieve him in the usual manner.

It should be noted that the subject fish rod holder and hook setter also serves to indicate to the fisherman when a fish has taken the bait. Such indication is afforded by the element 22 and rod 12 being in the forward or hook setting position as above-described. Due to this feature, the fisherman can be some distance from the rod 12 and still see when he has a strike at the bait at the end of his fish line.

Thus, the present invention provides a fish rod holder and hook setter which is capable of retaining a fish rod in proper operating position, and thereafter is operable to firmly set the hook in the fish's mouth and to afford indication to the fisherman that the strike has been made.

Although I have shown and described certain specific embodiments of my invention, I am fully aware that many modifications thereof are possible. My invention, therefore, is not to be restricted except insofar as is necessitated by the prior art and by the spirit of the appended claims.

I claim:
1. A fish rod holder and hook setter comprising in combination, a member to be anchored adjacent fishing water, a fish rod retaining element formed with holding means for retaining a fish rod, pivotal interconnecting means mounted on said member and having support means carrying said retaining element to permit pivotal movement of said retaining element about an axis normal to the fish rod thereon, and travel limiting means on said interconnecting means to abruptly stop pivotal movement of said element and rod thereon to effect setting of a fish hook associated with said rod.

2. A fish rod rolder and hook setter according to claim 1, wherein said travel limiting means comprises a pair of shoulders on said support means and retaining elements respectively for engagement upon predetermined pivotal movement of said retaining element from a normal to a hook setting position.

3. A fish rod holder and hook setter according to claim 1, wherein said support means comprises a bifurcated upper end portion on said anchor member, and said retaining element is provided with a main body portion formed with a reduced portion engagable with said bifurcated upper end portion of said anchor member.

4. A fish rod holder and hook setter according to claim 3, wherein engagement of said reduced portion with said bifurcated end portion permits of pivotal movement between said element and said anchor member, and stop means is provided therebetween to limit movement of said element in response to said predetermined force to thereby effect setting of a hook associated with said fish rod.

5. A fish rod holder and hook setter according to claim 4, wherein said stop means comprises one or more shoulders formed on said retaining element adjacent said reduced portion for engagement with said bifurcated upper end portion of said anchor member.

6. A fish rod holder and hook setter according to claim 5, wherein the main body of said retaining element is formed with a generally circular cross section throughout its length, and said reduced portion for pivotal engagement with said bifurcated support means is formed by oppositely disposed flat surfaces on said main body, the shoulders formed at the juncture of said flat surfaces and said circular cross section providing said stop means for limiting further pivotal movement of said retaining element.

References Cited by the Examiner

UNITED STATES PATENTS

| | | | |
|---|---|---|---|
| 1,275,928 | 8/1918 | Huppertz | 248—38 |
| 1,523,223 | 1/1925 | Leonardos | 248—38 |
| 1,534,642 | 4/1925 | Hoaglan | 248—38 |
| 1,608,795 | 11/1926 | Kennedy | 248—38 |
| 2,139,826 | 12/1938 | Huntly | 248—44 |
| 2,204,692 | 6/1940 | Parisio | 248—38 |
| 2,522,255 | 9/1950 | Climo | 248—42 |
| 2,593,783 | 4/1952 | Mitchell | 248—38 |
| 3,104,485 | 9/1963 | Wallingford | 43—15 |

CLAUDE A. LE ROY, *Primary Examiner.*